Figure 1:
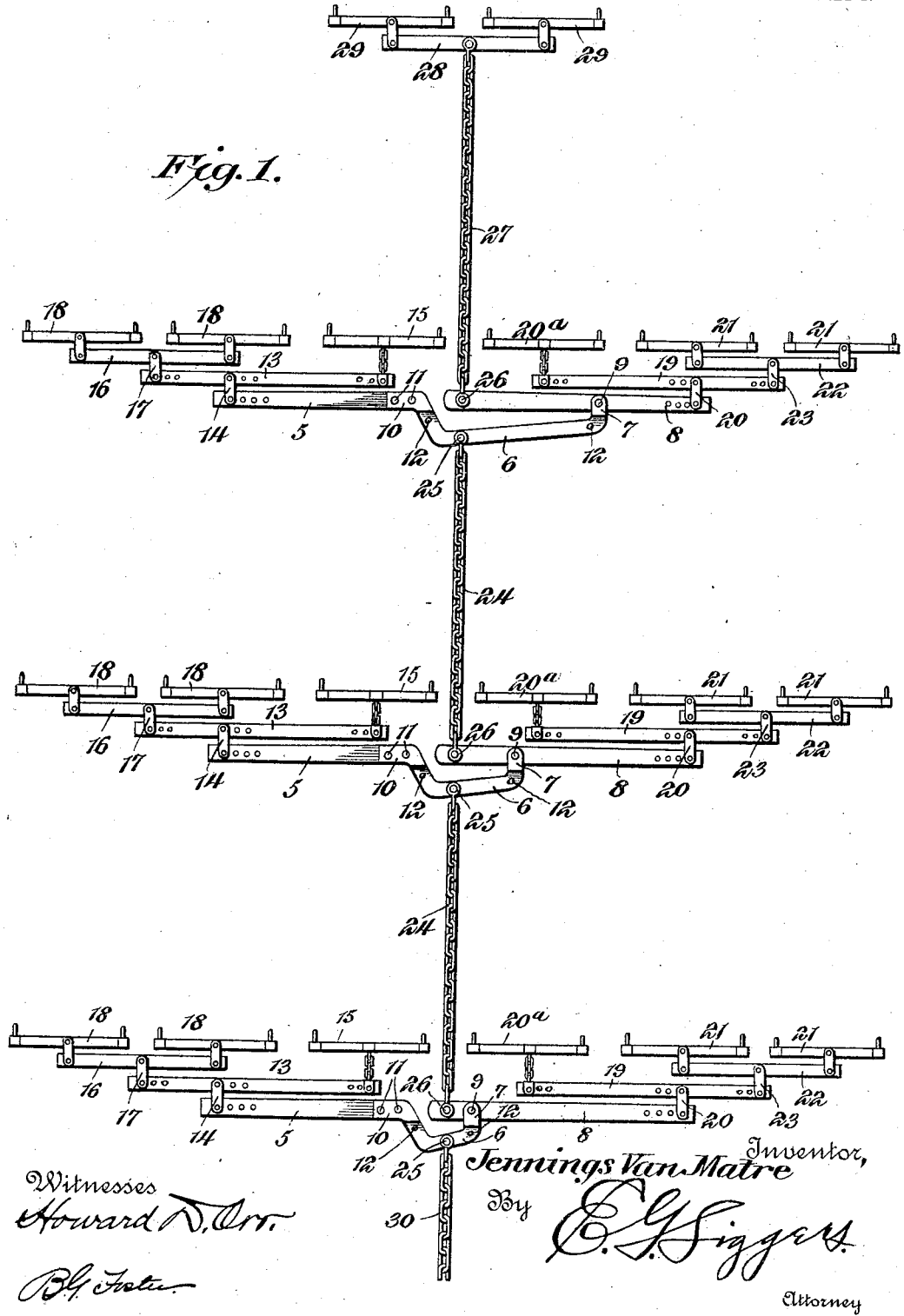

No. 878,027.

PATENTED FEB. 4, 1908.

J. VAN MATRE.
DRAFT EQUALIZER.
APPLICATION FILED JAN. 28, 1907.

2 SHEETS—SHEET 1.

Witnesses
Howard D. Orr.
B. G. Foster.

Inventor,
Jennings Van Matre
By E. G. Siggers
Attorney

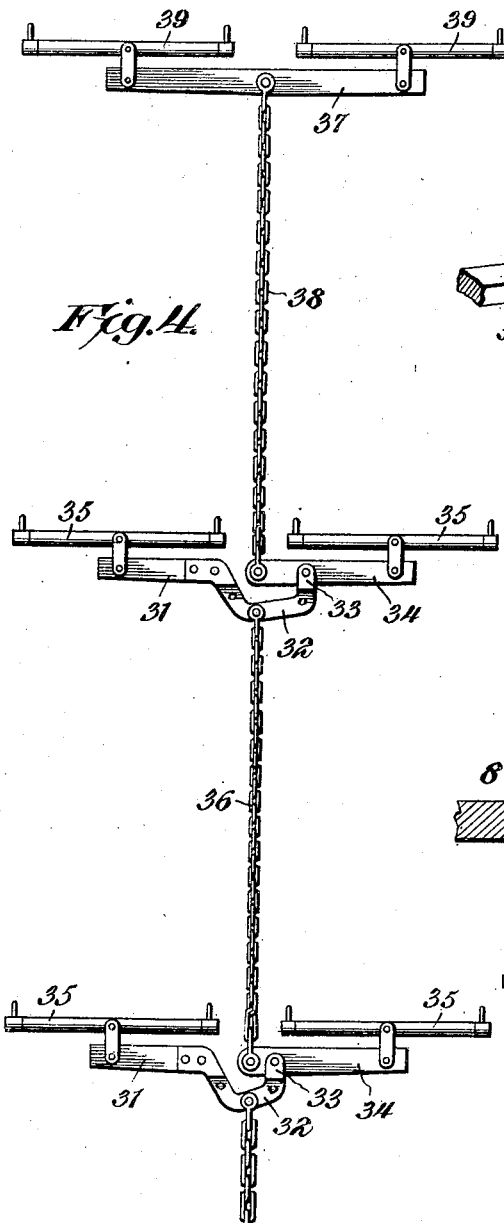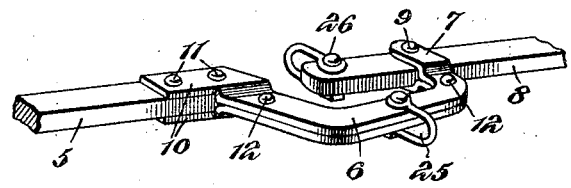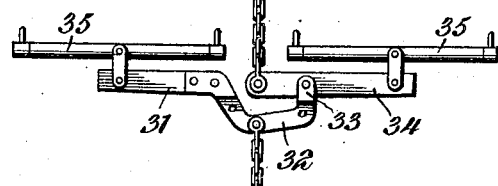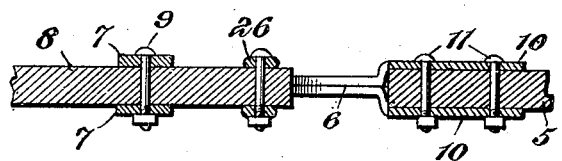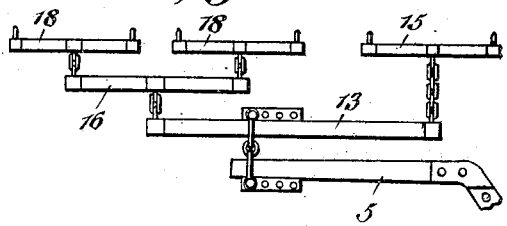

UNITED STATES PATENT OFFICE.

JENNINGS VAN MATRE, OF PASO ROBLES, CALIFORNIA.

DRAFT-EQUALIZER.

No. 878,027.

Specification of Letters Patent.

Patented Feb. 4, 1908.

Application filed January 28, 1907. Serial No. 354,471.

*To all whom it may concern:*

Be it known that I, JENNINGS VAN MATRE, a citizen of the United States, residing at Paso Robles, in the county of San Luis Obispo and State of California, have invented a new and useful Draft-Equalizer, of which the following is a specification.

This invention relates to improvements in draft equalizers, particularly intended for harvesters and other agricultural implements, though of course not necessarily limited to such uses.

The principal object is to provide a very simple structure of a novel nature that may be made to employ practically any number of horses or other draft animals, and is so arranged that each animal must do its quota of work, and cannot shirk at the expense of others, while the faster animals will be retarded to approximately the ratio of work of the others.

In the accompanying drawings:—Figure 1 is a plan view of a twenty horse equalizer constructed in accordance with the present invention. Fig. 2 is a detail perspective view of a portion of one of the evener bars and its associated lever. Fig. 3 is a longitudinal sectional view therethrough. Fig. 4 is a plan view showing a slightly modified form of construction. Fig. 5 is a detail view showing the preferred form of connections between the parts.

Similar reference numerals designate corresponding parts in all the figures of the drawings.

In the embodiment illustrated in Figs. 1, 2 and 3, a plurality of evener bars 5 are employed, each of which has a rearwardly extending offset terminal portion 6, provided with a forwardly extending terminal ear 7. It will be observed that these offset portions diminish in length from the front to the rear evener bar. A lever 8 is fulcrumed between its ends on the forwardly projecting ear 7, of each evener bar, and it will be noted that the arms of said levers vary in length, that is to say, the fulcrums 9 of the levers are consecutively disposed nearer the inner ends of the same. In the construction of the parts, the bar 5 is preferably made of hard wood, the offset portions 6 are of sheet metal bars having terminal portions 10 that embrace the inner ends of the bars 5 and are bolted or riveted thereto, as shown at 11. The intermediate portions are arranged against each other and riveted together, as shown at 12, and the ends or ears 7 are spaced apart to receive the levers between them.

Connected directly to the outer ends of the evener bars 5 are whiffletrees. While these whiffletrees may be arranged in any manner desired, the preferred form of construction is probably that shown in Fig. 1. A lever 13 is connected between its ends by links 14 to the evener bar 5. The inner end of said lever has a single whiffletree 15 connected thereto, while a doubletree 16 is connected by links 17 to the outer end of the lever 13. The doubletree in turn, has whiffletrees 18 connected to its ends. To the outer end of the lever 8 are connected a corresponding set of whiffletrees. Thus, a lever 19 is connected between its ends by links 20 to the outer end of the lever 8, and to the inner end of the lever 19 is connected a whiffletree 20$^a$. A pair of whiffletrees 21 are connected to a doubletree 22, which in turn is connected by links 23 to the outer end of the lever 19. These various whiffletrees are adjustable longitudinally along the bars or levers to which they are connected in order that the draft of the different animals may be properly equalized.

It will thus be observed that a plurality of horse power units are produced, arranged one in advance of the other. These are connected by draft cables 24, and while chains are shown, it is to be understood that the term "cable" is intended to define any suitable connection between the members. Each cable is connected at its front end to the offset portion 6 of the front evener bar, as shown at 25, while its rear end is connected as shown at 26 to the inner end of the lever disposed in rear of said bar. The foremost lever 8 has a draft cable 27 connected to its inner end and the front end of said cable is connected to the central portion of a whiffletree 28 having swingletrees 29 connected thereto. The rear evener bar 5 also has a suitable connection 30 with the harvester or other implement to be drawn.

It is to be observed that in the present construction, each lever 8 has its inner arm operating in advance of the rearwardly offset portion 6 of the beam, and that the front end of each cable is connected to the offset portion directly in line with the connection of the rear end of the next cable with the inner end of the lever. Consequently when all the cables are straight ahead, as illustrated in Fig. 1, they are all disposed in alinement and the connections are in like manner disposed in alinement. Furthermore they are located in the line of draft, and consequently there is no lateral strain or side draft upon the mechanism or the animals. With this construction, it will be evident that each animal is given a predetermined amount of work to do, and pulls against one or more of the other animals. The various connections permit the free swinging movement of the whiffletrees, and consequently each animal must do its quota of work, while it is opposed by the others, so that it is restricted to such quota. Experience has demonstrated that the draft equalizer is highly effective to perform these functions, and it will be evident that a number of power units or evener bars together with their levers and whiffletrees may be varied as desired in order to vary the number of animals employed. The change of leverage between the different beams is important. Thus in the foremost evener beam, the two animals in advance are pulling against three connected to the outer end of the foremost lever 8, but at the second evener beam 5, the outer three horses connected to the lever 8 are pulling against eight, and the leverage is therefore changed to compensate for this alteration. Thus the leverage is properly altered throughout the draft equalizer.

As an example of how the construction may be modified, attention is invited to Fig. 4, wherein the evener beams are shown at 31, and have the usual rearwardly extending offset portions 32 provided with forwardly extending terminal ears 33. Levers 34 are fulcrumed between their ends to the offset ears 33, and swingletrees 35 are connected to the outer ends of the levers 34 and the outer ends of the beams 31. Draft cables 36 connect the offset portion 32 of one beam with the inner end of the lever 34 of the beam disposed in rear of the same, and the doubletree 37 has a draft cable connection 38 with the inner end of the foremost lever 34. This doubletree is provided with the usual swingletrees 39. It will be evident that in this structure the same results and advantages are secured, as in the more involved equalizer above described.

From the foregoing, it is thought that the construction, operation, and many advantages of the herein described invention will be apparent to those skilled in the art, without further description, and it will be understood that various changes in the size, shape, proportion, and minor details of construction, may be resorted to without departing from the spirit or sacrificing any of the advantages of the invention.

Having thus fully described my invention, what I claim as new, and desire to secure by Letters Patent, is:—

1. In a draft equalizer, the combination with an evener beam having a rearwardly offset inner portion provided with a forwardly extending terminal, of a lever fulcrumed between its ends on said terminal and having its inner arm operating in advance of the rearwardly offset portion, whiffletrees connected to the outer ends of the beam and lever, a rearwardly extending draft cable connected to the rearwardly offset portion of the beam in rear of the inner end of the lever, a forwardly extending draft cable connected to the inner end of the lever in direct line with the connection of the rearwardly extending cable with the beam so that said cables are in the line of draft when straight ahead, and whiffletrees connected to the forwardly extending cable.

2. In a draft equalizer, the combination with a plurality of evener beams, having inner offset terminal portions provided with forwardly extending terminal ears, of levers fulcrumed between their ends on the terminal ears and having their inner ends disposed at different distances from said ears, whiffletrees connected to the outer ends of the evener beams and to the outer ends of the levers, and cables connecting the offset portions of the evener beams with the levers of the next adjacent beams, said cables being disposed in substantial alinement.

In testimony, that I claim the foregoing as my own, I have hereto affixed my signature in the presence of two witnesses.

JENNINGS VAN MATRE.

Witnesses:
CRES POULSON,
WALTER E. BREWSTER.